(12) United States Patent
Lin et al.

(10) Patent No.: US 8,862,664 B1
(45) Date of Patent: Oct. 14, 2014

(54) USING A DIGITAL IMAGE IN A SOCIAL NETWORKING SYSTEM

(75) Inventors: Jennifer W. Lin, San Jose, CA (US); Kaisuke Nakajima, San Jose, CA (US)

(73) Assignee: Google Inc., Mountain View, CA (US)

( * ) Notice: Subject to any disclaimer, the term of this patent is extended or adjusted under 35 U.S.C. 154(b) by 347 days.

(21) Appl. No.: 13/352,770

(22) Filed: Jan. 18, 2012

(51) Int. Cl.
*G06F 15/16* (2006.01)

(52) U.S. Cl.
USPC ............... 709/204; 705/14.41; 705/14.42; 705/14.69; 705/14.72

(58) Field of Classification Search
CPC ............... G06F 17/30265; A63F 13/12
USPC ......... 705/14.72, 14.69, 26.62; 709/205, 206, 709/207
See application file for complete search history.

(56) References Cited

U.S. PATENT DOCUMENTS

| | | | | |
|---|---|---|---|---|
| 7,912,366 | B2 | 3/2011 | Huliyapur Math | |
| 8,416,981 | B2* | 4/2013 | Vanhoucke et al. | 382/100 |
| 2008/0132251 | A1* | 6/2008 | Altman et al. | 455/457 |
| 2009/0102859 | A1* | 4/2009 | Athsani et al. | 345/619 |
| 2010/0318571 | A1* | 12/2010 | Pearlman et al. | 707/784 |
| 2011/0022529 | A1 | 1/2011 | Barsoba et al. | |
| 2012/0117473 | A1* | 5/2012 | Han et al. | 715/723 |

FOREIGN PATENT DOCUMENTS

WO    WO-2010/120901    10/2010

OTHER PUBLICATIONS

"Google Goggles"—Google, Jan. 2012 https://support.google.com/websearch/answer/166331?hl=en.*
"Is It Live or Is It AR"—Bolter et al, Jul. 2007 http://spectrum.ieee.org/computing/software/is-it-live-or-is-it-ar.*
Bolter et al., "Is it Live or is it AR?", IEEE Spectrum, Aug. 2007, 6 pages.
Golden Gate Bridge, Facebook, printed on Jan. 18, 2012, retrieved from internet URL: www.facebook.com/pages/Golden-Gate-Bridge, 2 pages.
Google Goggles, Google, printed on Jan. 18, 2012, retrieved from internet URL: www.google.com/mobile/goggles, 1 page.

* cited by examiner

Primary Examiner — Randy Scott

(57) ABSTRACT

Systems and methods for using a digital image in a social networking system may use digital image to identify a physical entity. Information about the identified physical entity may be provided to an electronic display for review by a user. The user may perform a social networking action with the identified physical entity or a website associated with the physical entity. Social networking actions may include rating or commenting about the physical entity or the associated website via a social networking system. Social networking actions may also include sharing information about the physical entity or associated website with another user via the social networking system.

15 Claims, 4 Drawing Sheets

USING A DIGITAL IMAGE IN A SOCIAL NETWORKING SYSTEM

BACKGROUND

The present disclosure relates generally to using a digital image in a social networking system. The present disclosure more specifically relates to receiving a social networking command regarding a physical entity in the digital image and/or a website associated with the physical entity.

Generally, online social networking systems allow users to share their opinions about any number of different topics with other users. For example, a user may rate up an online article that they enjoyed reading. Other users may be drawn to the article based on the number of people that also positively rated the article. A social networking system can also employ a suggestion mechanism. In such a case, a positive rating for an article by a user may result in the article being suggested to others in the user's social networking groups.

SUMMARY

Implementations of the systems and methods for using a digital image in a social networking system are described herein. One implementation is a computerized method for using a digital image in a social networking system. The method includes receiving, at a processing circuit, a request to log into a user profile of the social networking system. The method also includes receiving, at the processing circuit, a digital image of a physical entity. The method further includes associating the digital image with the user profile. The method yet further includes performing, by the processing circuit, image recognition on the digital image to identify the physical entity. The method also includes retrieving, from a memory, the name of the physical entity and an indication of a website associated with the physical entity. The method further includes providing entity data over a network, the entity data being configured to cause a graphical user interface to be displayed by an electronic display. The graphical user interface includes the name of the physical entity, the indication of a website associated with the physical entity, and one or more inputs configured to receive a rating for the website associated with the physical entity. The method also includes receiving, at the processing circuit, the rating for the website associated with the physical entity, the rating being associated with the user profile. The method further includes providing an indication of the rating for the website to an electronic device based on whether the electronic device is logged into a user account socially connected to the user account associated with the rating.

Another implementation is a computerized method for using a digital image in a social networking system. The method includes receiving, at a processing circuit, a digital image of a physical entity. The method also includes identifying, by the processing circuit, the physical entity in the digital image. The method further includes providing entity data for the identified physical entity. The entity data is configured to cause a graphical user interface (GUI) to be displayed by an electronic display that includes a name of the physical entity, a website associated with the physical entity, and one or more inputs configured to receive a social networking command. The method additionally includes receiving a social networking command for the physical entity or the website. The method also includes providing an indication of the social networking command to an electronic device.

A further implementation is a social networking system. The system includes a processing circuit operative to receive a digital image of a physical entity. The processing circuit is also operative to identify the physical entity in the digital image and to provide entity data for the identified physical entity. The entity data is configured to cause a GUI to be displayed by an electronic display that includes a name of the physical entity, a website associated with the physical entity, and one or more inputs configured to receive a social networking command. The processing circuit is further operative to receive a social networking command for the physical entity or the website. The processing circuit is additionally operative to provide an indication of the social networking command to an electronic device.

These implementations are mentioned not to limit or define the scope of this disclosure, but to provide examples of implementations to aid in understanding thereof.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

According to some aspects of the present disclosure, a digital image may be used as part of an online social networking system to allow users to express their opinions about entities that exist in the physical world. For example, a user may take a picture of a landmark using a mobile device to rate the landmark itself. Image recognition and/or location detection may be used in various implementations to identify the physical entity in the image. A singular entity profile may be stored for the physical entity, e.g., on a server of the social networking system, allowing multiple users to express their opinions about the same entity. Information about the identified physical entity may also be provided using the entity profile. For example, historical information about the physical entity may be displayed (e.g., the identity of the entity, when the entity came into being, etc.). In some cases, the opinions of other users about the physical entity may be provided (e.g., by rating the entity, by commenting about the entity, and the like). For example, the opinions of a user's social connections, i.e., other users in the user's social network, may be displayed to the user.

In some implementations, a user may perform a social networking action (e.g., rating, commenting, sharing, etc.) regarding a website associated with a physical entity in a digital image. This may be done in addition to, or in lieu of, actions regarding the physical entity itself. For example, a user may take a photograph of a particular restaurant. The restaurant in the image may be automatically recognized by the system. If the restaurant has an associated website (e.g., a website devoted to that particular restaurant or to a chain of restaurant), the user may rate the website. This may be done in addition to, or in lieu of, rating the particular restaurant.

Figure 1:
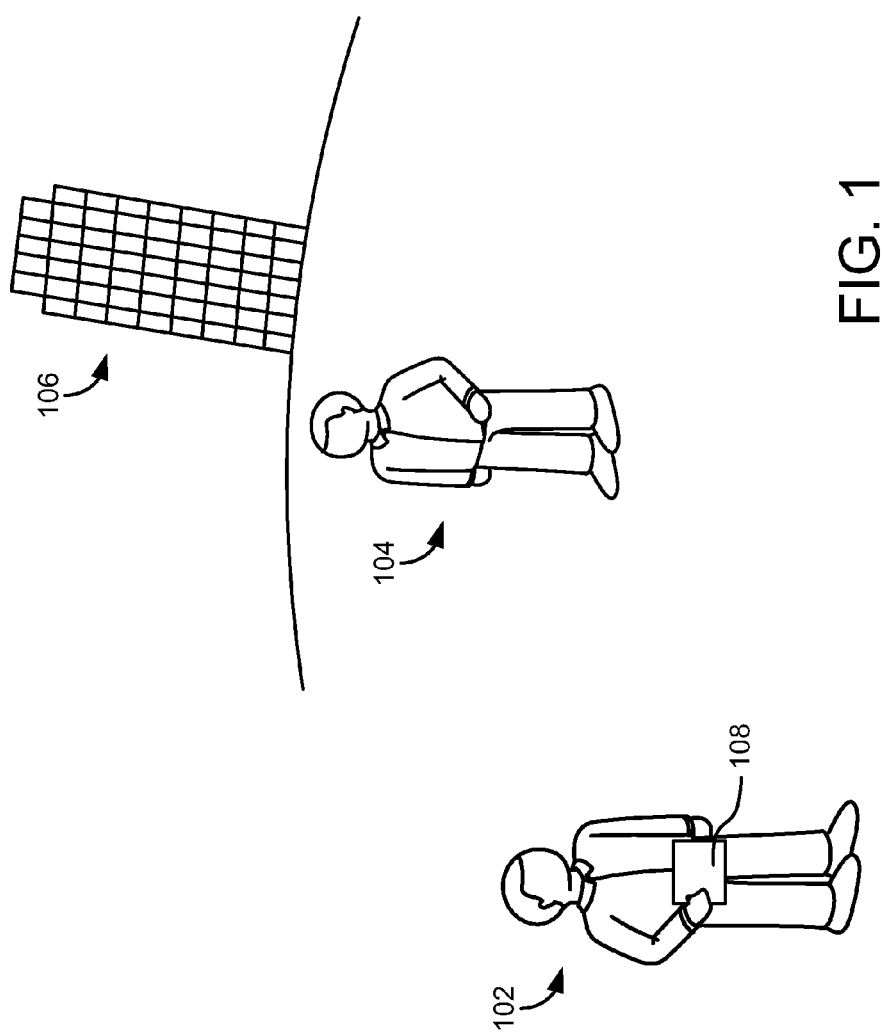
FIG. 1 is an illustration of a user capturing a digital image of a physical entity.

Referring to FIG. 1, an illustration of a user 102 capturing a digital image of a physical entity 106 is shown, according to one example. User 102 may utilize a mobile device 108 to capture the image, according to one implementation. Mobile device 108 may be any form of portable electronic device having an integrated camera. For example, mobile device 108 may be a cellular telephone, a laptop computer, a tablet computer, a portable video game player, a digital video recorder, or may simply be a digital camera. The integrated camera may include a charge-coupled device (CCD), an active-pixel sensor (APS), a photodiode, or any other form of light sensor. The captured digital image may be stored within an electronic memory of mobile device 108. In some implementations, mobile device 108 may be configured to communicate with other electronic devices. For example, mobile device 108 may communicate wirelessly via a network with one or more other electronic devices (e.g., using a radio, cellular, satellite, or other transceiver). In some implementations, mobile device 108 may communicate with another electronic device via a hardwired connection (e.g., using an Ethernet cable, using a universal serial bus (USB) cable, or the like).

As shown, user 102 may operate mobile device 108 to capture a digital image of physical entity 106 (e.g., the Leaning Tower of Pisa). For example, user 102 may operate mobile device 108 to capture a digital image of person 104 standing in front of the Leaning Tower of Pisa. The digital image may be analyzed to automatically identify physical entity 106 in the image. Information about physical entity 106 may be provided to user 102, based on the identification. A social networking system at which user 102 has a user profile may also allow user 102 to express an opinion about the physical entity 106. For example, user 102 may rate the Leaning Tower of Pisa up or down or post a comment about the Leaning Tower of Pisa via a social networking system. In another example, user 102 may share information about the Leaning Tower of Pisa with social connections of user 102.

In some implementations, physical entity 106 may have an associated website. For example, the Leaning Tower of Pisa may have an official website at the web address: http://www.example.org/Leaning_Tower.html. In such a case, information about a physical entity identified in a digital image may also include information about the associated website. User 102 may be able to perform a social networking action relating to the associated website in addition to, or in lieu of, one relating to physical entity 106 itself.

Figure 2:
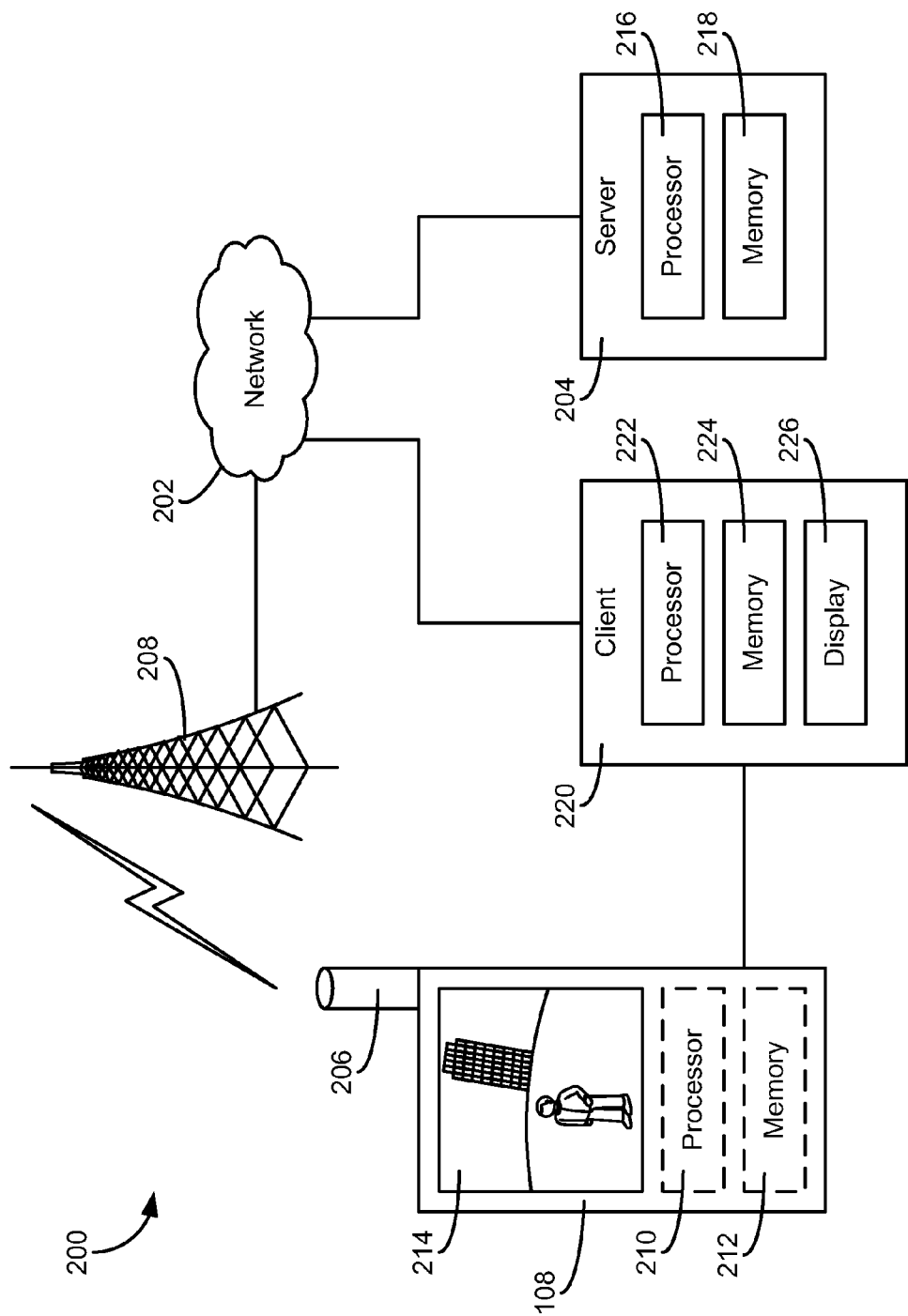
FIG. 2 is an illustration of a computer system in accordance with a described implementation.

Referring to FIG. 2, an illustration of a computer system 200 is shown. System 200 may include a server 204 in communication with other electronic devices via a network 202. In some implementations, mobile device 108 may communicate with server 204 via network 202. Server 204 may be part of a social networking system that allows a user to express their opinion about various topics with other users socially connected to the user (e.g., friends, acquaintances, co-workers, etc.). In further implementations, a client 220 may be in communication with server 204 via network 202 and utilized by a user to access the social networking system.

Network 202 may be any form of computer network that relays information between server 204, client 220, and/or mobile device 108. For example, network 202 may include the Internet and/or other types of data networks, such as a local area network (LAN), a wide area network (WAN), a cellular network, satellite network, or other types of data networks. Network 202 may also include any number of computing devices (e.g., computer, servers, routers, network switches, etc.) that are configured to receive and/or transmit data within network 202. Network 202 may further include any number of hardwired and/or wireless connections. For example, client 220 may communicate wirelessly (e.g., via WiFi, cellular, radio, etc.) with a transceiver that is hardwired to other computing devices in network 202 (e.g., via a fiber optic cable, a CAT5 cable, etc.).

Mobile device 108 may be any form of portable electronic device that includes a processor 210 and a memory 212, i.e., a processing circuit. Memory 212 may store machine instructions that, when executed by processor 210, cause processor 210 to perform one or more of the operations described herein. Memory 212 may also store one or more digital images by the integrated camera of mobile device 108. Processor 210 may include a microprocessor, ASIC, FPGA, etc., or combinations thereof. Memory 212 may include, but is not limited to, electronic, optical, magnetic, or any other storage or transmission device capable of providing processor 210 with program instructions. Memory 212 may include a floppy disk, CD-ROM, DVD, magnetic disk, memory chip, ROM, RAM, EEPROM, EPROM, flash memory, optical media, or any other suitable memory from which processor 210 can read instructions. The instructions may include code from any suitable computer programming language such as, but not limited to, C, C++, C#, Java, JavaScript, Perl, HTML, XML, Python and Visual Basic.

According to various implementations, mobile device 108 may include a transceiver 206 configured to communicate wirelessly with network 202 via transceiver station 208. For example, transceiver station 208 may be a cellular tower, a mobile hotspot (e.g., a Wi-Fi access point), a satellite transceiver, or similar mechanism that provides wireless access to network 202. According to various implementations, mobile device 108 may be configured to communicate directly with client 220, in addition to, or in lieu of communicating with transceiver station 208. For example, mobile device 108 may be hardwired to client 220 via a cable (e.g., a USB cable, a parallel port cable, etc.). In another example, mobile device 108 may communicate wirelessly with client 220 via transceiver 206 using a short-range wireless protocol (e.g., ad-hoc Wi-Fi, Bluetooth, etc.).

Mobile device 108 may include one or more user interface devices, according to various implementations. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of mobile device 108 (e.g., a built-in display, microphone, etc.) or external to the housing of mobile device 108 (e.g., a monitor connected to mobile device 108, a speaker connected to mobile device 108, etc.), according to various implementations. For example, mobile device 108 may include an electronic display 214, which may display a digital image captured by mobile device 108 and/or a GUI for the social networking system of server 204.

Client 220 may include of any number of different types of user electronic devices configured to communicate via network 202 (e.g., a laptop computer, a desktop computer, a tablet computer, a smartphone, a digital video recorder, a set-top box for a television, a video game console, combinations thereof, etc.). Similar to mobile device 108, client 220 may have a processing circuit that includes a processor 222 and a memory 224 that stores program instructions executable by processor 222. In some implementations, client 220 may include an electronic display 226, internally or externally, to provide a user with a user interface for the social networking system of server 204 (e.g., an application stored in memory 224, a website provided by server 204, etc.)

Server 204 may include one or more electronic devices configured to communicate with other electronic devices via network 202 and to provide the electronic devices with access to a social networking system. A social networking system allows a user to create a user profile and associate their user profile with that of other users. In some cases, associations between user profiles may be categorized by type. For example, a user may categorize other users by their relationship to the user (e.g., friends, relatives, co-workers, etc.) and/or by common interests (e.g., a common love of hockey, a common interest in shipbuilding, etc.). Server 204 may provide a user interface for the social networking system to other electronic devices via network 202. For example, server 204 may provide a website to client 220 and/or to mobile device 108. In another example, client 220 and/or mobile device 108 may run a local application for the social network that receives data from server 204.

Similar to mobile device 108, server 204 may have a processing circuit that includes a processor 216 and a memory 218. Memory 218 may store instructions for execution by processor 216 to perform the functions associated with a social networking system. According to various implementations, server 204 may be a set of networked devices (e.g., a data center, a plurality of data centers, a cloud computing environment, etc.). In such a case, the processing circuit of server 204 may include the combined set of processors and memories of the different devices. For example, server 204 may include a webserver that provides websites to client 220 and/or to mobile device 108 and a back-end database that stored user profiles and other data associated with the social networking system.

According to various implementations, mobile device 108 and/or client 220 may provide a digital image to server 204 via network 202, to identify a physical entity in the image (e.g., physical entity 106). For example, mobile device 108 may capture an image of the physical entity and server 204 may utilize image recognition to identify the physical entity in the image. In some implementations, other data may also be sent to server 204 to identify the physical entity. For example, a latitude, a longitude, and/or a location radius value corresponding to the location at which the image was captured may be sent to server 204 and used to identify the physical entity in the image. For example, the geographic location at which an image of the Leaning Tower of Pisa was captured may be matched by server 204 to the geographic location of the Leaning Tower of Pisa. Such location matching may be used in combination with image recognition, or in lieu thereof, to determine that the image is of the Leaning Tower of Pisa. According to some implementations, the image recognition and/or geographic location matching may be performed by mobile device 108 and/or client 220. In such a case, mobile device 108 or client 220 may provide an indication of the identified physical entity to server 204, to retrieve information about the identified entity and to perform social networking functions associated with the physical entity.

In some implementations, server 204 may store a unique identifier and additional information about a physical entity in memory 218. For example, server 204 may store information such as the background of the physical entity (e.g., how the entity was formed or constructed, when the entity was formed or constructed, etc.). In one implementation, server 204 may store the location of a website associated with the physical entity. For example, server 204 may store an official URL for the Leaning Tower of Pisa.

Server 204 may provide information about a physical entity to mobile device 108 and/or to client 220. After the physical entity in a digital image has been identified (e.g., by mobile device 108, client 220, server 204, etc.), information about the entity may be retrieved by server 204 from memory 218 or another location. For example, server 204 may combine information about the identified entity stored in memory 218 (e.g., an entity profile) with other information stored on various websites. The information about the physical entity may be provided by server 204 to mobile device 108 and/or client 220. In some cases, server 204 may automatically return information about a physical entity, in response to receiving a digital image of the entity from mobile device 108 and/or client 220 and without requiring any further user input. In other cases, server 204 may return information about the entity, in response to receiving a request for information from mobile device 108 or client 220 (e.g., if the physical entity is identified by mobile device 108 or client 220).

In one implementation, mobile device 108 and/or client 220 may be utilized to create a new identifier for a physical entity in server 204. A user of mobile device 108 or client 220 may be prompted to enter information about a physical entity that cannot be identified in a digital image. For example, server 204 may store an entity profile for the Leaning Tower of Pisa, but may not have an entity profile for the town statue in Dunning, Nebr. In such a case, a user of mobile device 108 or client 220 may be prompted to enter information about the statue (e.g., the name of the statue, the background of the statue, a website for the statue, etc.). The entered information, the digital image, and/or the location information may be stored by server 204 to identify the statue in the future.

According to various implementations, server 204 may be configured to perform certain social networking functions associated with an identified physical entity. For example, a user having a social networking profile on server 204 may perform activities such as rating the physical entity, commenting on the physical entity, or recommending the physical entity to their social connections (e.g., other user profiles connected to the user's profile via the social networking system). In further implementations, the user may perform social networking activities for a website associated with the identified physical entity. In some cases, server 204 may also provide an indication of social networking activity by others to a user's device. For example, server 204 may provide an indication to mobile device 108 or client 220 of the user's social connections rating the physical entity, commenting on the physical entity, or sharing the physical entity with the user.

Figure 3:
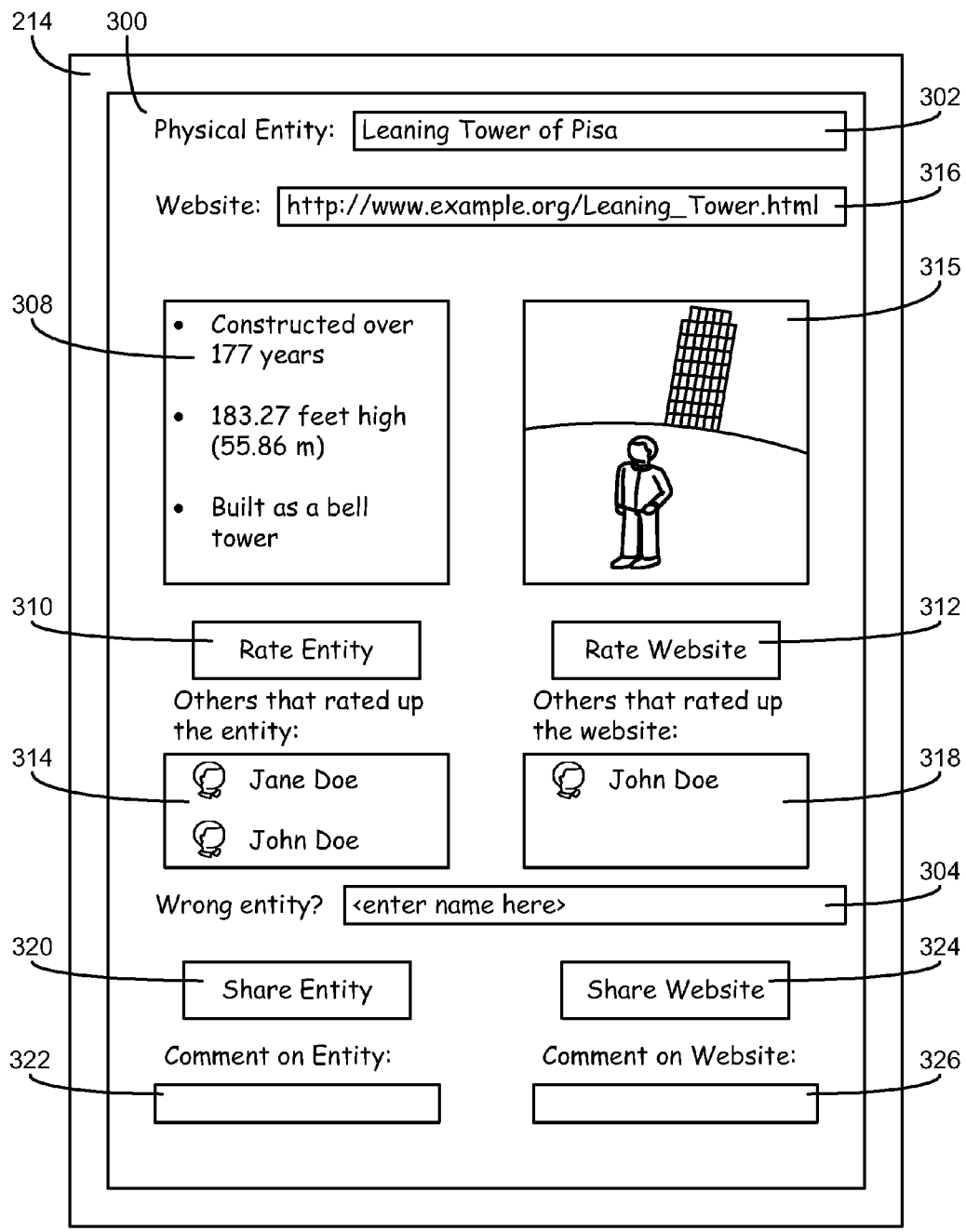
FIG. 3 is an example display of a GUI.

Referring now to FIG. 3, an example display of a GUI 300 is shown, according to a described implementation. GUI 300 may be provided to an electronic display of a user device used to access a social networking system (e.g., mobile device 108, client 220, etc.). For example, GUI 300 may be provided to display 214 of mobile device 108 or to display 226 of client 220. In one implementation, GUI 300 may be provided to display 214 in response to the physical entity in digital image 315 being identified (e.g., by mobile device 108, by client 220, by server 204, etc.). A physical entity in a digital image may be identified automatically when the image is captured or may be identified in response to receiving a command from a user interface to do so. For example, mobile device 108 may automatically send digital image 315 to server 204 for identification, when digital image 315 is captured. In another example, the user of mobile device 108 may select to have the physical entity in digital image 315 identified. Digital image 315 may or may not be provided as part of GUI 300, according to various implementations.

GUI 300 may include an identifier 302 for the identified physical entity in digital image 315. For example, the Leaning Tower of Pisa may be identified in digital image 315 by mobile device 108, by client 220, or by server 204. Identifier 302 may include the name of the physical entity and/or other identification information for the physical entity (e.g., location coordinates, nicknames for the physical entity, etc.). For example, the name "Leaning Tower of Pisa" may be displayed as part of GUI 300.

GUI 300 may include an input field 304 configured to receive an identifier for the physical entity in image 315. According to various implementations, input field 304 may or may not be provided as part of GUI 300, based on a confidence score for the identification process being below a predetermined score. Such a confidence score may indicate the likelihood that the identified physical entity is actually the physical entity in image 315. One factor that may be used to calculate a confidence score is how closely the location information associated with image 315 is to that of the identified physical entity. For example, an image taken at the base of the Leaning Tower of Pisa may receive a higher confidence score that the entity in the image is, in fact, the Leaning Tower of Pisa. Another factor that may be used to calculate the confidence score is how well the features of the image match those of the identified entity. For example, the entity in the image may be partially obscured by people or other objects, potentially decreasing the accuracy of image recognition. In various implementations, input field 304 may be presented as part of GUI 300 if the confidence score is below a confidence threshold. For example, if the confidence score corresponds to a 95% likelihood that the identified entity is the entity in the digital image, input field 304 may be hidden. However, if the confidence score is only 55%, input field 304 may be displayed on GUI 300.

Input field 304 may be configured to add a new profile for a physical entity to the social networking system. In some cases, a physical entity may not be identified in a digital image because information about the entity is not known by the system. In one implementation, information about an unknown physical entity entered into input field 304 may be used to create a new entry for the entity in the memory of the device that identifies physical entities. In some implementations, the entered information about the new physical entity may be available to other user. For example, a first user may enter information about a physical entity shown in a digital image. When another user also takes a picture of the entity, the entity may be automatically identified based on the information entered by the first user. In other implementations, information about a new physical entity may be available after a certain number of users have identified the same entity. For example, a physical entity may be automatically identified by the system only after ten users have manually identified the same entity. Such a feature may prevent false entries from being available to other users. In further implementations, a user profile may have an associated trustworthiness score that may be used to determine whether information about a newly identified physical entity is available to other users. For example, a user that writes for a travel magazine may have a high trustworthiness score and their entries may be immediately available to other users. However, an entry from a teenager with a low trustworthiness score may not be available unless verified by others.

GUI 300 may include information 308 about an identified physical entity. Information 308 may include historical information about the physical entity, trivia about the physical entity, statistics about the physical entity, and other information about the identified physical entity. For example, if the physical entity in digital image 315 is the Leaning Tower of Pisa, information 308 may include information as to how it was constructed, its height, and why it was constructed. In some implementations, information 308 may be entered by a user (e.g., the user that first identified the Leaning Tower of Pisa in the system, a subsequent user, etc.). In other implementations, information 308 may be aggregated via a web search for information about the physical entity. For example, the device that identifies the Leaning Tower of Pisa in digital image 315 may perform an Internet search to retrieve additional information about the physical entity. In some implementations, information 308 may include one or more hyperlinks to websites that contain information about the physical entity (e.g., websites not officially associated with the physical entity).

GUI 300 may include a rating input 310 configured to receive a rating for the physical entity from a user interface device. Rating input 310 may be any form of input field to rate an physical entity identified in a digital image. In some implementations, rating input 310 may be configured to receive a positive rating for the physical entity. For example, rating input 310 may allow a user to simply rate up the physical entity (e.g., rating input 310 is a single button to positively rate the physical entity). According to various implementations, rating input 310 may be configured to receive a negative rating for the physical entity, in addition to, or in lieu of, being configured to receive a positive rating. In some implementations, a rating may be classified by degree. For example, a physical entity may be rated by a user on a sliding scale to indicate how much the user likes or recommends the physical entity. In such cases, rating input 310 may be a text field (e.g., allowing users to enter a score ranging from A-F, from 1-10, etc.), a sliding bar, one or more checkboxes, a selectable radial field, or any other mechanism configured to allow a user to specify a relative strength of a rating for the physical entity.

GUI 300 may include a field 314 that provides an indication of which other users also rated the physical entity. For example, users "John Doe" and "Jane Doe" may have positively rated the Leaning Tower of Pisa. In such a case, an indication of one or more of the users that rated the physical entity may be provided as part of GUI 300 in field 314. In some implementations, the users identified in field 314 may be connected with the social networking profile of the user operating the device displaying GUI 300. For example, the user of mobile device 108 may be logged into their user profile on the social networking system provided by server 204. In some implementations, which users are presented in field 314 may be based in part on their relationship to the user of mobile device 108 via the social networking system. For example, users classified as friends of the user may take priority over that of the user's coworkers. In various implementations, field 314 may display the total number of ratings (e.g., positive ratings, negative ratings, etc.) for the physical entity. For example, field 314 may display the total number of positive ratings by a user's social connections or by all users of the social networking system. In one implementation, a total score may be provided, if users are able to rate the physical entity using a range of values. For example, the physical entity may receive an average rating of 9.5 out of a possible 10.

GUI 300 may include a sharing input 320, in some implementations. Sharing input 320 may be configured to allow the user of the device to share information about the identified physical entity to one or more social connections via the social networking system. In some implementations, sharing input 320 may be configured to allow a user to specifically recommend the identified physical entity to certain users (e.g., a particular user, a group of users, all social connections of the user, etc.). For example, sharing input 320 may be used to recommend the Leaning Tower of Pisa to the user's sister or to a social group devoted to tourism of which the user belongs. Sharing a physical entity with a social connection may cause a notification to be received by a social connection or may cause information about the physical entity to appear in the user's newsfeed. According to various implementations, the functions associated with sharing input 320 may be integrated with that of rating input 310 or vice versa. For example, a user positively rating the Leaning Tower of Pisa via rating input 310 may cause a social connection of the user to receive information about the Leaning Tower of Pisa.

GUI 300 may include a comment field 322 configured to receive a comment about the identified physical entity. For example, the user of mobile device 108 may provide a comment about the Leaning Tower of Pisa to other users of the social networking system via comment field 322. A comment received via comment field 322 may be provided to other users of the social networking system. For example, a comment entered via comment field 322 may appear in the user's newsfeed, on a displayed field associated with the physical entity (e.g., in field 314 of GUI 300), on a profile page for the physical entity, or sent as a notification to one or more social connections of the user.

According to various implementations, GUI 300 may be configured to provide information about a website associated with an identified physical entity. For example, the Leaning Tower of Pisa may have an official website at the URL: http://www.example.org/Leaning_Tower.html. In such a case, GUI 300 may include a website identifier field 316. Once a physical entity has been identified (e.g., by using image recognition on digital image 315 and/or using location information associated with digital image 315), a URL or other identifier for a website associated with the entity may be retrieved and displayed as part of GUI 300. In some implementations, website identifier field 316 may include a hyperlink to the website (e.g., website identifier field 316 may be selected to navigate to the identified website).

In implementations in which an identified physical entity has an associated website, GUI 300 may be configured to provide social networking functionality for the website in a manner similar to that of the physical entity itself. For example, GUI 300 may include a rating input 312 to rate the website associated with the identified physical entity. GUI 300 may also include field 318 configured to display ratings, comments, or other activity related to the website by social connections of the user. Similarly, GUI 300 may include a sharing input 324 for sharing the website and/or a comment field 326 for entering a comment about the website.

In further implementations, a physical entity may be part of a group of related physical entities. For example, the restaurant chain, "Thank Goodness for Mondays!" may have locations in Las Vegas, Seattle, and Chicago. In such a case, GUI 300 may allow a user to enter social networking commands (e.g., to share, rate, comment on, etc.) regarding the group of entities and/or an individual physical entity. For example, the user of mobile device 108 may take a picture of the restaurant location in Las Vegas. In response, GUI 300 may provide information about that particular restaurant location and/or may provide information about the entire restaurant chain. Similarly, GUI 300 may be configured to receive commands to perform social networking functions relating to the Las Vegas location or to the restaurant chain itself. For example, the user may positively rate the Las Vegas location because of its architecture or may comment on the entire restaurant chain (e.g., that they enjoy eating at Thank Goodness for Mondays! restaurants, etc.).

Input received via GUI 300 may be associated with a user profile of a social networking system. For example, the user operating mobile device 108 may log into their user profile in a social networking system, to retrieve and share information about the Leaning Tower of Pisa with others. Input received via rating inputs 310, 312, sharing inputs 320, 324, and/or comment fields 322, 326 may be provided to a server of the social networking system. For example, a user of mobile device 108 may utilize comment field 322 to provide a comment about the Leaning Tower of Pisa with others via the server of the social networking system.

Figure 4:
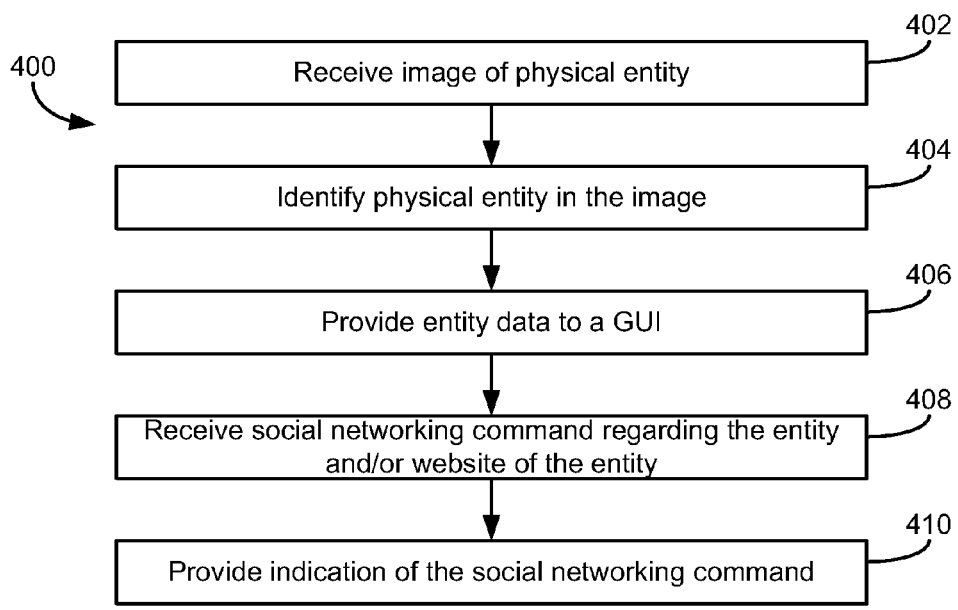
FIG. 4 is an example process for using an image in a social networking system.

Referring to FIG. 4, an example process 400 for using an image in a social networking system is shown. Process 400 includes receiving an image of a physical entity (block 402). The image may be captured, for example, by a portable electronic device having an integrated camera. In some implementations, the image may be received at the portable electronic device capturing the image. For example, the digital image may be received in response to operation of a CCD, APS, or other form of light sensing mechanism integrated into the portable electronic device. In other implementations, the digital image may be received at a server or other client device. For example, the digital image may be provided to a home computer or other consumer electronic device by the portable electronic device that captured the image. In another example, the digital image may be received by a server of a social networking system directly from the portable electronic device or indirectly (e.g., the digital image is first uploaded to a client device and then sent to the server).

Process 400 includes identifying a physical entity in the image (block 404). In some implementations, the device that receives the digital image may be configured to retrieve information about a physical entity from a database. For example, a server of a social networking system may include a database of physical entity identifiers (e.g., entity names, unique numbers, etc.) and associated characteristics of the physical entity (e.g., location information for the physical entity, relative size or shape information for the physical entity, etc.), as part of a physical entity profile in the social networking system. In some implementations, image recognition may be performed on the received image to identify the physical entity in the image. For example, the characteristics of the physical entity in the image (e.g., shape, proportionate size, coloration, etc.) may be matched to those in the database, to identify the physical entity. In some implementations, location information associated with the image may be used as part of the identification. For example, the latitude, longitude, and/or radius of the location at which the image was captured may be used to identify the physical entity. The system may also use the direction that the mobile device was facing (e.g., from an electronic compass on the device) to assist in identifying the physical entity. In some implementations, a confidence score may be calculated to denote the likelihood that the identified physical entity is actually the physical entity in the image. The confidence score may be calculated, for example, based on how closely the characteristics in the database match those of the image.

Identification of the physical entity may be performed by a server of a social networking system, a client device, or by the portable electronic device that captured the image, according to various implementations. For example, the digital image may be sent to a server from a mobile telephone, to perform image recognition on the image. Alternatively, the mobile telephone itself may be configured to identify a physical entity in a digital image. For example, the mobile telephone may include a database of physical entities or may query a database of physical entities via a network. In another example, a digital image may be uploaded to a client device configured to identify physical entities.

Process 400 includes providing entity data to a GUI (block 406). Entity data is to be understood as any information regarding a physical entity (e.g., a name of the entity, background information about the entity, the location of the entity, trivia about the entity, an official website associated with the entity, websites that contain further information about the entity, etc.). After the physical entity has been identified, entity data may be retrieved and displayed. In some implementations, entity data may be stored with the characteristics used to identify the physical entity. In other implementations, the identification information may be stored separately from that of other information about the entity. For example, a mobile phone may identify a physical entity using a local database and provide an indication of the identified entity to a remote server, to retrieve entity data for the physical entity.

According to various implementations, the GUI may be a website, a standalone application, or a combination thereof. For example, the GUI may be a website provided by a server of the social networking system. The server may retrieve the entity data and provide a website containing the data to a user device. In another example, the GUI may be part of a program running on a user device. For example, the GUI may be part of a software application used to capture the digital image. In such a case, the information about the physical entity may be provided by a local database or by a remote server to the GUI.

Process 400 includes receiving a social networking command regarding the physical entity and/or a website associated with the physical entity (block 408). A social networking command refers to any command to perform an action associated with a user profile of a social networking system. For example, a social networking command may correspond to a command from a user to positively rate the physical entity or website, store a comment on the physical entity or website, or share information about the physical entity or website with others via the social networking system. The social networking command may be received, for example, from a user interface device (e.g., a keypad, a pointing device, a touch screen display, etc.) at a client device or a portable electronic device. In another example, the social networking command may be received at a server of the social networking site from another electronic device (e.g., a client device, a portable electronic device, etc.).

Process 400 includes providing an indication of the social networking command to another device (block 410). The indication may be provided to a server of the social networking system or to an electronic device operated by a user, according to various implementations. In cases in which the social networking command is received at a server of a social networking system, the server may provide an indication of the associated action to another user electronic device. For example, a user may input a comment on the physical entity using a first device. The comment may be provided to a server of the social networking system. The server may provide an indication of the comment to a second device operated by a second user (e.g., a social connection of the first user). For example, the comment itself may be provided to the second device or a notification that the first user entered a comment may be provided. In cases in which the social networking command is received at a user electronic device, the user electronic device may provide an indication of the action to a server of the social networking system.

In one example of process 400, a user may capture a digital image of a physical entity using their mobile telephone. The image may be transmitted from the mobile telephone to a server of a social networking system. The server, in turn, may use the digital image to identify the physical entity in the image and to retrieve information about the identified entity. The server may then transmit the retrieved information about the entity to the mobile telephone, which displays the information as part of a GUI. The user of the mobile telephone may then utilize the GUI to positively rate the physical entity and/or a website associated with the physical entity. The server of the social networking system may receive the positive rating from the mobile telephone and provide an indication of the rating to one or more other devices (e.g., user devices operated by other users of the social networking system).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an opesocial networking system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a USB flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending websites to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a GUI or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A computerized method for using a digital image in a social networking system comprising:
   receiving, at a processing circuit, a request to log into a user profile of the social networking system;
   receiving, at the processing circuit, a digital image of a physical entity;
   associating the digital image with the user profile;
   performing, by the processing circuit, image recognition on the digital image to identify the physical entity;
   retrieving, from a memory, the name of the physical entity and an indication of a website associated with the physical entity;
   providing entity data over a network, wherein the entity data is configured to cause a graphical user interface to be displayed by an electronic display, the graphical user interface comprising the name of the physical entity, the indication of a website associated with the physical entity, and one or more inputs configured to receive a rating for the website associated with the physical entity;
   receiving, at the processing circuit, the rating for the website associated with the physical entity, the rating being associated with the user profile; and
   providing an indication of the rating for the website to an electronic device based on whether the electronic device is logged into a user account socially connected to the user account associated with the rating.

2. The method of claim 1, wherein the one or more inputs are configured to receive a comment about the physical entity or about the website.

3. The method of claim 1, further comprising:
   receiving, at the processing circuit, location information corresponding to the location at which the digital image was captured; and using the location information to identify the physical entity in the digital image.

4. The method of claim 1, wherein the one or more inputs are configured to receive a social networking command, the social networking command is associated with a user profile of a social networking system and the indication of the social networking command is provided to the electronic device based in part on a social connection of the user profile.

5. The method of claim 1, further comprising:
   determining, at the processing circuit, a confidence score indicative of the likelihood that the physical entity identified by the processing circuit is the physical entity in the digital image; and
   wherein the graphical user interface further comprises an input configured to receive a physical entity identifier, the input displayed in the graphical user interface based in part on the confidence score.

6. The method of claim 1, wherein the graphical user interface comprises a selectable area to positively rate the physical entity or the website.

7. The method of claim 1, wherein the website is an official website for the physical entity.

8. The method of claim 1, wherein the entity data is further configured to cause the graphical user interface to display an indication of when the physical entity came into being.

9. A social networking system comprising a processing circuit operative to:
   receive at a processing circuit, a request to log into a user profile of the social networking system;
   receive at the processing circuit, a digital image of a physical entity;
   associate the digital image with the user profile;
   perform by the processing circuit, image recognition on the digital image to identify the physical entity;
   retrieve from a memory, the name of the physical entity and an indication of a website associated with the physical entity;
   provide entity data over a network, wherein the entity data is configured to cause a graphical user interface to be displayed by an electronic display, the graphical user interface comprising the name of the physical entity, the indication of a website associated with the physical entity, and one or more inputs configured to receive a rating for the website associated with the physical entity;
   receive at the processing circuit, the rating for the website associated with the physical entity, the rating being associated with the user profile; and
   provide an indication of the rating for the website to an electronic device based on whether the electronic device is logged into a user account socially connected to the user account associated with the rating.

10. The system of claim 9, wherein the one or more inputs are configured to receive a comment about the physical entity or about the website.

11. The system of claim 9, further comprising:
    receiving, at the processing circuit, location information corresponding to the location at which the digital image was captured; and
    using the location information to identify the physical entity in the digital image.

12. The system of claim 9, wherein the one or more inputs are configured to receive a social networking command, the social networking command is associated with a user profile of a social networking system and the indication of the social networking command is provided to the electronic device based in part on a social connection of the user profile.

13. The system of claim 9, further comprising:
    determining, at the processing circuit, a confidence score indicative of the likelihood that the physical entity identified by the processing circuit is the physical entity in the digital image; and
    wherein the graphical user interface further comprises an input configured to receive a physical entity identifier, the input displayed in the graphical user interface based in part on the confidence score.

14. The system of claim 9, wherein the graphical user interface comprises a selectable area to positively rate the physical entity or the website.

15. The system of claim 9, wherein the entity data is further configured to cause the graphical user interface to display an indication of when the physical entity came into being.

* * * * *